Oct. 27, 1953 W. T. REA 2,657,261
ERROR-INDICATING CODE MECHANISM
Filed Dec. 13, 1951 3 Sheets-Sheet 1

INVENTOR
W. T. REA
BY
R. C. Terry
ATTORNEY

Oct. 27, 1953  W. T. REA  2,657,261
ERROR-INDICATING CODE MECHANISM
Filed Dec. 13, 1951  3 Sheets-Sheet 2
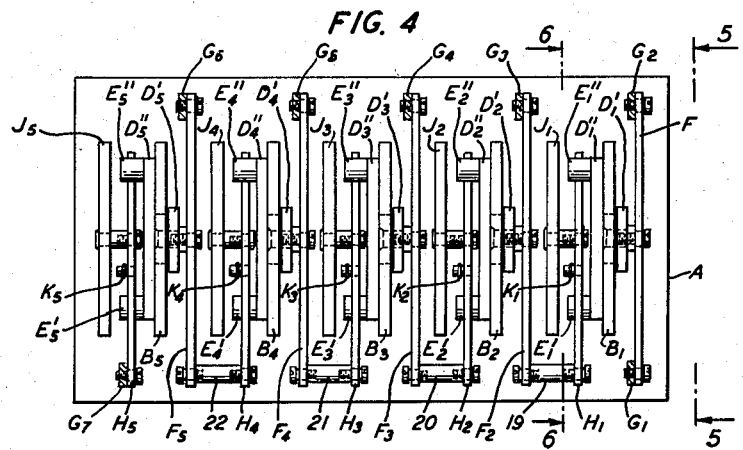
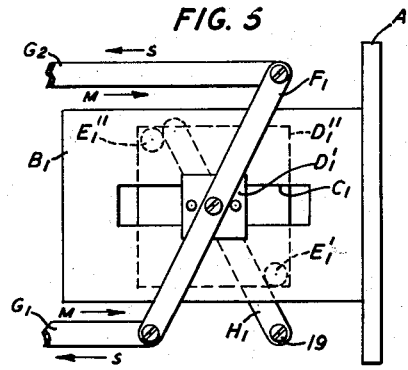
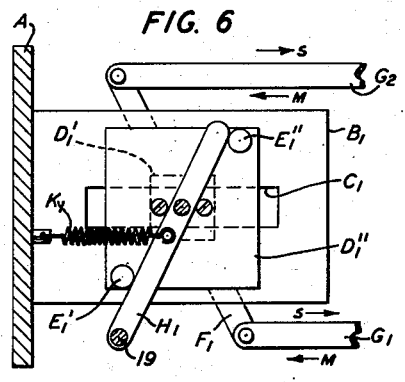
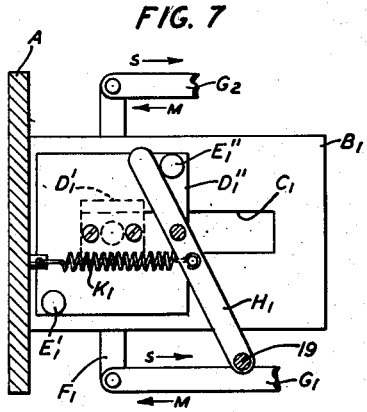
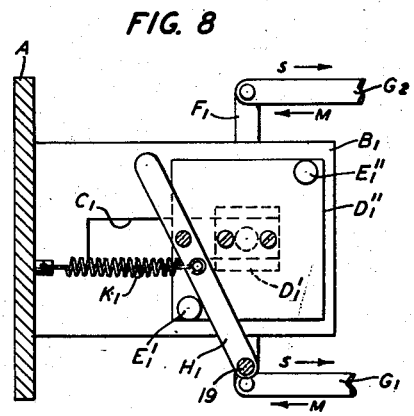
INVENTOR
W. T. REA
BY
*R. C. Terry*
ATTORNEY Oct. 27, 1953

W. T. REA 2,657,261

ERROR-INDICATING CODE MECHANISM

Filed Dec. 13, 1951

INVENTOR
W. T. REA
BY
R. C. Terry
ATTORNEY

Patented Oct. 27, 1953

2,657,261

UNITED STATES PATENT OFFICE 2,657,261

ERROR-INDICATING CODE MECHANISM

Wilton T. Rea, Manhasset, N. Y., assignor to Bell Telephone Laboratories, Incorporated, New York, N. Y., a corporation of New York Application December 13, 1951, Serial No. 261,549

12 Claims. (Cl. 178—23)

This invention relates to teletypewriters and more particularly to mechanisms for indicating errors in recording transmitted and received teletypewriter signals.

Error-detecting codes have been found useful in a number of applications. The two-out-of-five code, which yields ten choices, is employed in multifrequency signaling, automatic message accounting and other decimal systems. The three-out-of-seven code, which yields thirty-five choices, has been used in teletypewriter systems, and a two-out-of-fifteen code is employed in a selective calling system for mobile radio communication. Codes of this type indicate any error which does not comprise the addition of a number of pulses and the elimination of an equal number of others.

There is another type of error-detecting code which employs a permutation code combination in which choices involving an odd or even number of impulses are used. It is arbitrary which is to be used: either those choices which include an even number of marking signal elements or those which include an odd number of marking signal elements may be used. In the former case the reception of an odd number of marking elements will indicate the occurrence of an error and in the latter, the reception of an even number of marking elements indicates the occurrence of an error. In either case, erroneous reception of an odd number of signal elements may be detected, but this code is incapable of detecting erroneous reception of an even number of signal elements.

In the invention hereinafter described it is assumed that a six-unit code is used and the sixth signal element of each signal combination is made marking or spacing in order that there will be an even number of marks and an even number of spaces in each signal combination.

An object of the present invention is to mechanically check each teletypewriter signal combination to determine whether or not the signal has the predetermined odd or even number of marks and/or spaces.

Another object is to cause a symbol indicative of an error in transmission to be printed in response to erroneous reception of an odd number of signal elements.

In accordance with the present invention a mechanically operated lever arrangement is connected to the code selector bars of a six-unit code teletypewriter wherein each of the six selector bars is, in turn, arranged to operate to and remain in either of two positions in response to an element of the six-unit code signal combination. These six selector bars, upon assuming either of two opposite positions, cause five primary levers referred to herein as input levers of the lever arrangement, to assume positions determined by the nature of the elements of each signal combination, each element being of either marking or spacing character. The first five elements of the signal combination are chosen in accordance with the regular five-unit permutation code and the sixth element may be so chosen that the total number of marking elements is either even or odd. In the case herein described, both the total marks and the total spaces are assumed to be even numbers in each signal combination. Each primary lever has associated with itself a secondary lever and these two levers constitute the principal elements of an assembly, there being five assemblies employed in a system using a six-unit code. The operation of each primary lever is jointly controlled by a selecting element of the signal combination and the combined effect of the element preceding this corresponding element in the signal combination. In other words, the first primary lever is responsive to the first two selecting elements of each signal combination and the first secondary lever is controlled in its operation by the first primary lever upon responding to the first and second elements; the second primary lever is jointly controlled in its operation by the first secondary lever and the third element, and the second secondary lever is controlled in its operation by the second primary lever; in a similar manner, each of the third, fourth and fifth primary levers is jointly controlled in its operation by both the second, third and fourth secondary levers, respectively and the fourth, fifth and sixth elements, respectively, and also each of the third, fourth and fifth secondary levers is controlled in its operation by the third, fourth and fifth primary levers, respectively. It will be noted that each of the second, third, fourth and fifth secondary levers depends for its operation on both the primary and secondary levers of the preceding assemblies. Therefore, in response to each signal combination the secondary lever of the last assembly is operated to either of two positions depending on whether the total marks and the total spaces are odd or even numbers. If the numbers are even as assumed herein, all the signal elements of the combination are assumed to be correct but, if they are odd, an error has occurred in an odd number of the elements. When the signal elements are correctly received the secondary lever of the last assembly, upon moving to its controlled position in response to the signal combination, operates a seventh, or error-indicating, bar to one of two opposite positions. When the seventh bar is operated to one of these positions, the type bar corresponding to the character for the signal having the correct impulses, is allowed to operate and record the desired character. When one of the elements of the signal is in error, the seventh bar is moved to its alternate position wherein the regular type bars are prevented from operating, but a special type bar is permitted to operate and thereby record an error symbol. The error-indicating bar is positioned immediately above and parallel to the six-code selector bars. The secondary lever of the last assembly is also referred to herein as the output lever. The invention is adapted to operate the error-indicating bar whenever the signal combination contains an odd number of errors.

A feature of the invention is the provision of two extra bars positioned immediately above the five regular code selector bars and movable, with regard to direction, in a manner similar to that in which the five regular bars are moved. The sixth bar, which also is a code selector bar, is responsive to the sixth signal element but has no pull-bar notches in that the entire section usually used for notches is cut away to permit all pull bars to operate in response to their respective signal combinations. The seventh bar has notches provided along the entire length of its inner edge and these notches are so arranged with respect to the regular pull bars that when the seventh bar is in its normal position any one of the regular pull bars may be selected, but when the seventh bar is moved into its alternate position the regular pull bars are prevented from operating but the pull bar engaging the special type bar is allowed to be selected under the influence of its coil spring so that it will be raised by the printing bail to cause the recording of the error symbol by the special type bar.

Another feature is the provision of the output lever arranged, in response to a signal having the correct impulse combination, to move into one position whereby any of the regular type bars may operate in response to its respective signal combination, and to move into an alternate position whereby the regular type bars are prevented from operating but the error-indicating bar may operate to record the error symbol when one of the elements of the signal combination is in error.

Other objects and features will be obvious from the following specification and drawing of which:

Fig. 1 shows, in perspective, a somewhat expanded view of the lever arrangement comprising the five lever assemblies mounted on a base plate. The first assembly, shown on the right-hand side, is jointly controlled by the first and second code selector bars of the teletypewriter and the second to the fifth assemblies are respectively controlled in part by the third to the sixth code selector bars, the other part of the control being had by the reaction of the preceding assemblies in response to the preceding signal elements. The lever arrangement, shown lying on its side in Fig. 1, when installed in a teletypewriter would be positioned vertically and the lever assemblies would be operated in planes parallel to those of the code selector bars;

Fig. 4 is a front elevation view of the lever arrangement of Fig. 1;

Fig. 5 shows a view taken along line 5—5 of Fig. 4 wherein the operating bars responsive to the first and second code selector bars of the teletypewriter are in spacing and marking positions, respectively;

Fig. 6 shows a view in the reverse direction relative to that of Fig. 5, and taken along line 6—6 of Fig. 4;

Fig. 7 shows another view taken along the same line as Fig. 6 but with the operating bars responsive to the first and second code selector bars of the teletypewriter, both in their marking position;

Fig. 8 shows still another view taken along the same line as Fig. 6 with the same operating bars in their spacing position;

Figure 10:
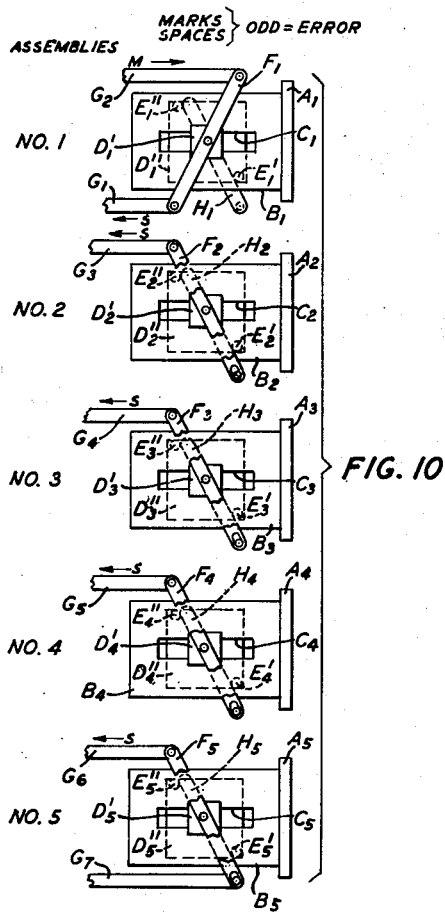
Figure 11:
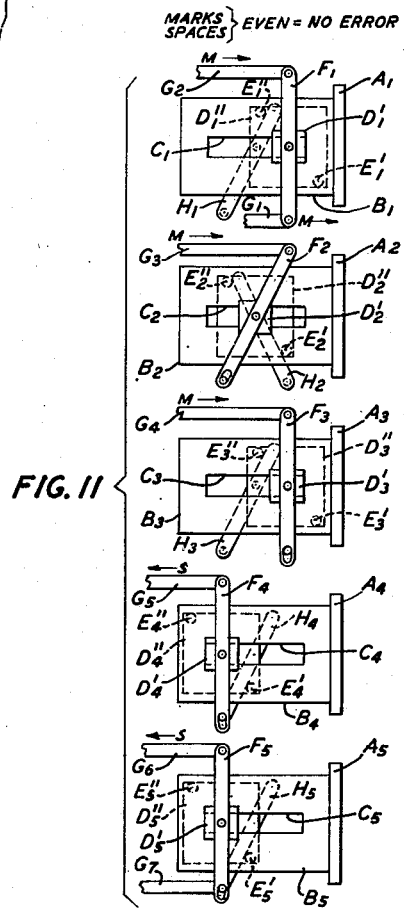

Fig. 10 shows the relative setting of the primary and secondary levers in each of the five lever assemblies operated in response to a code signal combination containing an error, there being one mark and five spaces, both odd numbers, in such signal combination; and Fig. 11 shows the relative setting of the primary and secondary levers in each of the five lever assemblies in response to another code signal combination which contains no error inasmuch as there are four marks and two spaces, both even numbers, in such other signal combination.

The lever arrangement constituted in the invention may be applied to the disclosures of either the Morton-Krum Patent 1,745,633 or the Morton-Krum-Kleinschmidt Patent 1,904,164, respectively issued February 4, 1930, and April 18, 1933, the former disclosure being that of a tape type receiving teletypewriter and the latter, a page type receiving teletypewriter. The disclosure of both patents are hereby made a part of this disclosure as if fully included herein.

The arrangement herein described employs a six-unit teletypewriter code wherein the first five elements convey the intelligence by representing the character or function to be selected, in accordance with the usual five-unit code, and the sixth element is made either marking or spacing in order that the six elements shall be comprised of an even number of marking elements and an even number of spacing elements. The arrangement with a few obvious modifications may also be arranged to operate as a six-unit code having an odd number of marks and an odd number of spaces in each signal combination and in such event the error-indicating bar provided immediately above the six selector code bars would be notched to permit the error-indicating pull bar to operate when the signal combination contains an even number of marks and an even number of spaces.

Figure 1:
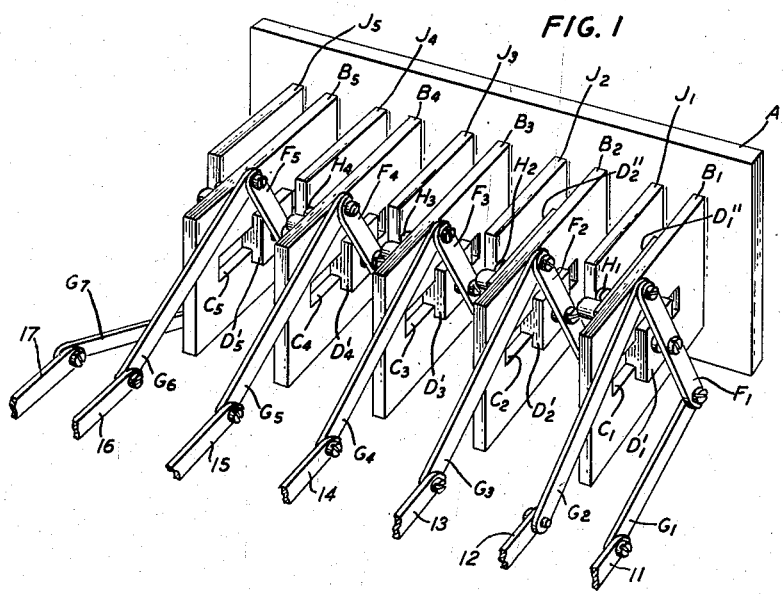
Figure 3:
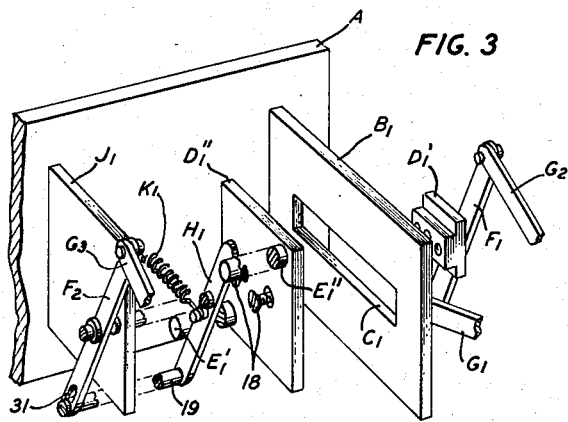
Fig. 3 is an exploded view of the constituent parts of a single lever assembly for mounting in the lever arrangement shown in Fig. 1.

The lever arrangement comprises five mechanical checking lever assemblies, each having two plates B and J fixedly mounted at one edge to base plate A. With respect to the lever arrangement as shown in Fig. 1 plate A is positioned in a vertical plane to the right of the code selector bars in the teletypewriter shown in Fig. 9, the base plate being fixedly attached to the base of the teletypewriter. The five assemblies are positioned adjacent to each other, each assembly being connected to the code selector bars of the teletypewriter and the plates of the five assemblies are mounted in parallel, and as shown in Fig. 1, in vertical planes. Each plate B has a horizontal slot C centrally located. A slider D is arranged to move to and fro within each slot. Each slider is constituted of two parts securely attached to each other by machine screws 18 as shown in Fig. 3, the smaller part $D_1'$ being positioned on the right-hand side of plate $B_1$ as shown in Fig. 3 and the larger part $D_1''$ on the left-hand side. Pivotally mounted in the center of the outer side of the smaller part D' of each slider D is a primary lever F. The primary lever $F_1$ of the first checking assembly is connected at its lower end by link bar $G_1$, to extended arm 11 of the first code selector bar of the teletypewriter, and at its upper end by another link bar $G_2$, to extension 12 of the second code selector bar. Each of the primary levers of the second, third, fourth and fifth assemblies is connected at its upper end by a link bar to an extension of the corresponding code selector bar such as the third, fourth, fifth and sixth selector bars taken in order, and at its lower end to the lower end of a secondary lever H which is pivotally connected to its plate J.

The larger part D'' of each slider D has fixedly mounted on its outer side two studs E (Fig. 3), one (E') at its inner lower left-hand corner and the other (E'') at its outer upper right-hand corner, for controlling the operation of its associated secondary lever. The secondary lever H as hereinbefore stated, is pivotally mounted on the right-hand side (Fig. 3) of plate J at a point in alignment with the center of the slot in plate B. The secondary lever is normally held by its coil spring K in a position such as shown in Fig. 6, wherein slider D is centrally located in slot C. In this position the secondary lever rests against the inner side of the upper stud E'' on slider D and against the inner side of the lower stud E'. The lower end of the secondary lever extends below plate J sufficiently to be pivotally attached to the lower end of the primary lever of the next subsequently arranged checking, or lever, assembly. The secondary lever of the last checking assembly is pivotally connected by link bar $G_7$ to extension 17 of the error-indicating bar 23 of the teletypewriter.

Figure 2:
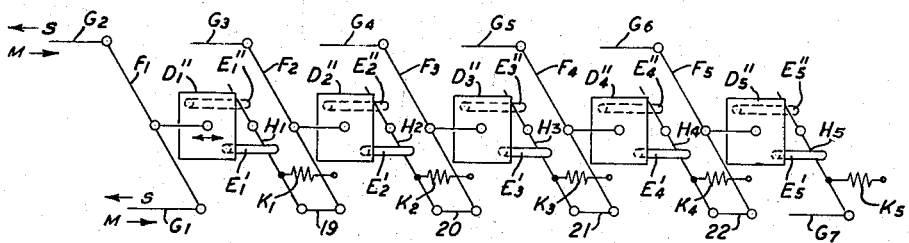
Fig. 2 shows the relative arrangement, in schematic form, of the five lever assemblies of Fig. 1, the five assemblies being shown in order, from left to right.

In Fig. 2 which shows in schematic form the relative arrangement of the essential parts of the lever arrangement of the present invention, primary lever $F_1$ is shown connected at its lower end to link bar $G_1$ and at its upper end to link bar $G_2$, primary lever $F_2$ connected at its upper end to link bar $G_3$ and at its lower end to secondary lever $H_1$, primary lever $F_3$ connected at its upper end to link bar $G_4$ and at its lower end to secondary lever $H_2$, primary lever $F_4$ connected at its upper end to link bar $G_5$ and at its lower end to secondary lever $H_3$ and primary lever $F_5$ connected at its upper end to link bar $G_6$ and at its lower end to secondary lever $H_4$. In the fifth assembly secondary, or output, lever $H_5$ is shown connected at its lower end to link bar $G_7$. Each of the secondary levers $H_1$, $H_2$, $H_3$, $H_4$ and $H_5$ is normally held in the positions indicated in Fig. 6, that is, with a minimum stress in their respective springs K. In their normal position the secondary levers are in engagement with both of their respectively associated studs E' and E''. Any movement of a code selector bar causes a corresponding movement of a primary lever whereby the slider on which the primary lever is pivotally mounted may move horizontally to either side or remain centered in the slot to maintain in or operate to either of two positions its associated secondary lever. The secondary lever is influenced to its operated position by either of studs E' and E''.

In Fig. 3 is shown an exploded view of the first assembly wherein each of plates $B_1$ and $J_1$ is fixed at one edge to base plate A, and primary lever $F_1$ is shown pivotally connected at its middle point to the smaller part $D_1'$ of slider D and pivotally connected at its lower end to link bar $G_1$ and at its upper end to link bar $G_2$, the smaller part $D_1'$ of slider D being securely fastened to the larger part $D_1''$ by means of machine screws 18. The slider $D_1$ is arranged to fit into slot $C_1$ of plate $B_1$. Secondary lever $H_1$ which is pivotally mounted on plate $J_1$ is normally held in engagement with studs $E_1'$ and $E_1''$ by means of coil spring $K_1$. The lower end of secondary lever $H_1$ is shown pivotally connected to the lower end of primary lever $F_2$ by means of shaft 19 whereby the movement of the primary lever $F_2$ of the next assembly is jointly controlled by the operation of link bar $G_3$ and the position of secondary lever $H_1$. In order to permit free movement of primary lever $F_2$ as well as of primary levers $F_3$, $F_4$ and $F_5$, each of these levers is provided at its lower end with slot 31 wherein the shaft 19 may be slidably held.

In Fig. 4, which shows the front elevation view of the lever arrangement, secondary lever $H_1$ is shown connected to primary lever $F_2$ by means of shaft 19, secondary lever $H_2$ is shown connected to primary lever $F_3$ by means of shaft 20. Secondary lever $H_3$ is shown connected to primary lever $F_4$ by means of shaft 21 and secondary lever $H_4$ is shown connected to the primary lever $F_5$ by means of shaft 22. Any movement of a primary lever is generally controlled by its associated link bar and the position of the secondary lever of the next preceding assembly except in the case of primary lever $F_1$ which is jointly controlled by two link bars, namely $G_1$ and $G_2$. The secondary, or output, lever $H_5$ is controlled in its movement by studs $E_5'$ and $E_5''$ on the larger part of $D_5''$ of slider $D_5$ when slider $D_5$ is moved against the resiliency of spring $K_5$.

When slider $D_1$ is centered in slot $C_1$, it indicates that the first two elements of a signal combination are marking and spacing respectively, or spacing and marking, respectively. In Fig. 5 wherein the two link bars $G_1$ and $G_2$ are in spacing and marking positions, respectively, a view taken along the dash and dotted line 5—5 in Fig. 4 accordingly shows primary lever $F_1$ so positioned that its lower end is away from base plate A and its upper end is toward base plate A. Inasmuch as the lever is pivotally mounted on slider $D_1$ the slider is disposed in the center of slot C. A secondary lever $H_1$ shown for its greater length in dotted line is pivoted to plate $J_1$, not shown but located to the rear of plate $B_1$. It is shown in an opposite position to that of primary lever $F_1$ because of spring $K_1$. Fig. 6 shows the opposite side of Fig. 5, secondary lever $H_1$ being shown in full line and held in normal position by coil spring $K_1$. In Fig. 6 secondary lever $H_1$ is shown having shaft 19 in cross-sectional view, for pivotally connecting lever $H_1$ to the lower end of primary lever of the next succeeding lever assembly.

The spacing and marking elements of an input signal combination move their respective code selector bars of the teletypewriter longitudinally in opposite directions, respectively, and accordingly, in response to a marking element the corresponding link bar to which the code selector bar is connected is moved toward the base plate A of the lever arrangement, and in response to a spacing element the corresponding link bar is moved away from that plate. When the first two elements of a signal combination are marking, both respective link bars $G_1$ and $G_2$ are operated toward base plate A to move slider $D_1$ to the innermost portion of slot $C_1$ and when both are spacing, both respective link bars are operated away from base plate A to move the slider $D_1$ to the outermost portion of slot C, the slider being moved by means of the primary lever $F_1$. Figs. 7 and 8 show the reverse side of the first lever assembly shown in Fig. 5. Fig. 7 shows the assembly upon receiving two successive marking impulses and Fig. 8 shows it upon receiving two successive spacing impulses. Accordingly, secondary lever $H_1$ which is pivotally mounted on stationary plate $J_1$, not shown in Fig. 7 or 8, is moved in Fig. 7 by stud $E_1''$ and in Fig. 8 by stud $E_1'$ to its off-normal position as shown by coil spring $K_1$ being under tension. The position assumed by secondary lever $H_1$ is substantially the same for either extreme position of the slider. The position of secondary lever $H_1$ determines the position of the lower end of the primary lever of the next succeeding lever assembly when the next element of the signal combination operates its corresponding link bar, which in this case will be operating bar $G_3$. The signal element controlling operating bar $G_3$ may be either marking or spacing and if such element is marking, link bar $G_3$ is pushed inwardly toward base plate A and if spacing, is pulled outwardly away from base plate A. If the signal element is marking to cause link bar $G_3$ to be pushed inwardly toward base plate A and the secondary lever of the first assembly is assumed to be in a position wherein its upper end is toward base plate A and its lower end is away from base plate A, primary lever $F_2$ of the second assembly, in response to this marking signal element, will assume a position with its upper end toward base plate A and its lower end away from base plate A like the position of primary lever $F_1$ shown in Fig. 5. But if link bar $G_3$ is pulled outwardly away from base plate A, in response to a spacing signal element at a time when the secondary lever of the first assembly is similarly positioned, primary lever $F_2$ of the second assembly will assume the position like that of primary lever $F_1$ shown in Fig. 8, wherein slider $D_2$ moves into the outermost portion of slot $C_2$ and secondary lever $H_2$, under the influence of stud $E_2'$ will be moved to its off-normal position like secondary lever $H_1$ shown in Fig. 8. The others of the primary and secondary levers are similarly controlled, as will be described hereinafter.

Figure 9:
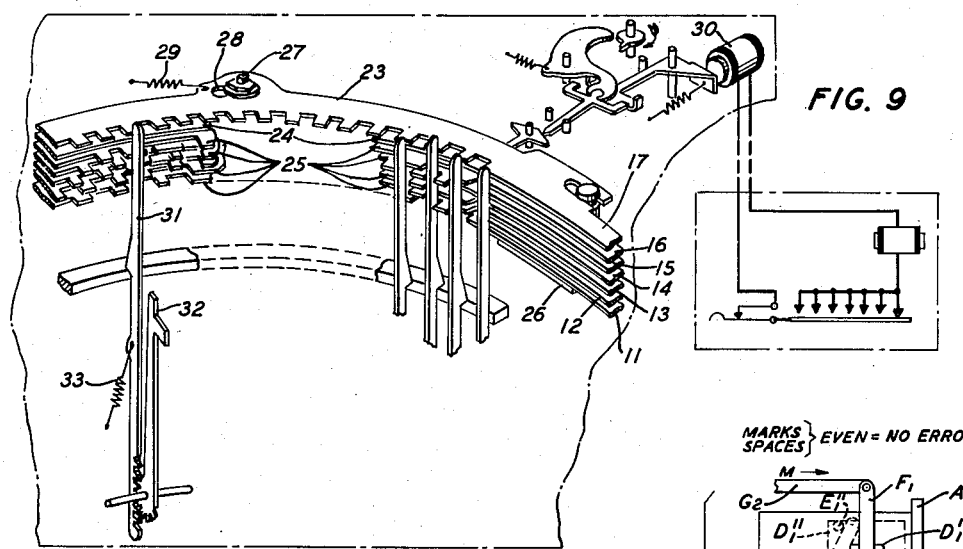
Fig. 9 shows typical telegraph receiving and selecting mechanisms of a teletypewriter equipped with seven operable bars, six of which are code selector bars and the other, the error-indicating bar, and means for connecting the lever arrangement of the invention to the seven bars.

In Fig. 9, the mechanism for indicating an error in a code signal combination is shown to include two horizontal operable bars, namely, error-indicating bar 23 and additional code selector bar 24. Bars 23 and 24 are mounted above the five regular code selector bars 25. The seven bars are slidably mounted above fixed plate 26. Bolt 27 is fastened to fixed plate 26 and extends upward through slot 28 in each of the seven bars whereby each of the seven bars is restricted in its movement to either of two positions. Error-indicating bar 23, additional code selector bar 24 and the five regular code selector bars are provided with suitable extended portions 17, 16, 15, 14, 13, 12 and 11, respectively. Extended portions 11 to 17, inclusive, are pivotally connected to link bars $G_1$ to $G_7$, respectively, as hereinbefore stated and as shown in Fig. 1. The error-indicating bar 23 is normally held in its left-hand position by spring 29 and is operable to its right-hand position against the tension of spring 29 by link bar $G_7$. Each of the code selector bars is operable to either of its two positions in response to a signal element received by printer selector magnet 30. Code selector bar 24 has its inner edge cut away for its entire length, that is, no wards are provided, to permit all the regular pull bars of the teletypewriter to operate. It serves only to respond to the sixth element of a six-unit code, whereby the regular five-unit code may have in addition an extra or sixth element selected as marking or spacing so as to provide an even number of marks and an even number of spaces in each signal combination. Error-indicating bar 23 has a full complement of notches provided along its inner edge so that all the regular pull bars may operate without interference when the bar is in its normal position. However, when bar 23 is moved to the right or off-normal position by extended portion 17, the wards prevent the regular pull bars from operating but a special notch provided at a point where a ward is omitted in bar 23 and in vertical alignment with a notch in bar 25, permits pull bar 31, connected to special type bar 32, to operate. The operation of pull bar 31 causes special type bar 32 to operate and thereby record the error symbol, to indicate an error in a code signal combination.

METHOD OF OPERATION

Signal combination with error

Assume as shown in Fig. 10 that the received code signal combination is in error and that there is an odd number of marks and an odd number of spaces contained therein. The six-unit code signal is assumed to be space, mark, space, space, space and space, one of these signal elements being in error.

First lever assembly

In response to the first signal element which is a space the first regular code selector bar 25 is operated toward the left to pull link bar $G_1$ and the lower end of primary lever $F_1$ toward the left, or away from base plate A. The second signal element, which is a mark, operates the second code selector bar 25 toward the right to push link bar $G_2$ toward the right, or toward base plate A. This operation causes primary lever $F_1$ to position its slider $D_1$ in the middle portion of slot $C_1$. Secondary lever $H_1$ pivoted on stationary plate $J_1$ on the opposite side of plate $B_1$, is accordingly positioned by its spring $K_1$, not shown, so that its upper end is away from base plate A and its lower end is toward base plate A as shown in lever assembly No. 1 of Fig. 10.

Second lever assembly

Secondary lever $H_1$ having been positioned with its upper end away from base plate A and its lower end toward base plate A as just described, causes the lower end of primary lever F₂ to which it is pivotally connected by shaft 19, to move toward base plate A. In response to the third signal element which is a space, the third code selector bar 25 is operated toward the left to pull link bar G₃ and the upper end of primary lever F₂ away from base plate A. Since the lower end of primary lever F₂ is held in the position toward base plate A by shaft 19 and secondary lever H₁ and the upper end of primary lever F₂ is held in its position away from base plate A, slider D₂ assumes the position in the middle portion of slot C₂ and secondary lever H₂ is moved to its normal position, as shown in the lever assembly No. 2, under the influence of its spring K₂, that is, with its lower end towards base plate A and its upper end away from base plate A.

*Third lever assembly*

When secondary lever H₂ is in the position shown in assembly No. 2 (Fig. 10) primary lever F₃ of assembly No. 3 assumes the position wherein its lower end is toward base plate A since the lower end of primary lever F₃ is connected to the lower end of secondary lever H₂ by shaft 20. In response to the fourth signal element which is also a space, the fourth code selector bar 25 is operated toward the left to pull link bar G₄ and the upper end of primary lever F₃ away from base plate A. For the same reason as stated above for the second assembly, the upper end of primary lever F₃ is held away from base plate A and the lower end is held toward base plate A, to position slider D₃ in the middle portion of slot C₃. Accordingly secondary lever H₃ is moved to its normal position as shown in assembly No. 3 under the influence of its spring K₃.

*Fourth lever assembly*

Since secondary lever H₃ is in the position wherein its upper end is away from base plate A and its lower end is toward base plate A, primary lever F₄ of assembly No. 4 assumes the position wherein its lower end is toward base plate A since the lower end of primary lever F₄ is connected to the lower end of secondary lever H₃ by shaft 21. In response to the fifth signal element which is another space, the fifth code selector bar 25 is operated toward the left to pull link bar G₅ and the upper end of primary lever F₄ away from base plate A. Primary lever F₄ therefore assumes the position with its upper end away from base plate A, and its lower end toward base plate A to position slider D₄ to the middle portion of slot C₄. Accordingly, secondary lever H₄ assumes its normal position under the influence of its spring K₄.

*Fifth lever assembly*

Since secondary lever H₄ is in the position wherein its upper end is away from base plate A and its lower end is toward base plate A, primary lever F₅ of assembly No. 5 assumes a position wherein its lower end is toward base plate A since the lower end is connected to the lower end of secondary lever H₄ by shaft 22. In response to the sixth signal element which is a space, the sixth code selector bar 23 is operated toward the left to pull link bar G₆ and the upper end of primary lever F₅ away from base plate A. Primary lever F₅ assumes the position where its upper end is away from base plate A and its lower end toward base plate A, to position slider D₅ in the middle portion of slot C₅. Therefore, secondary lever H₅ assumes its normal position under the influence of its spring K₅.

When secondary lever H₅ assumes its normal position in that its upper end is away from base plate A and its lower end is toward base plate A, the lower end upon moving toward base plate A pulls link bar G₇ toward base plate A. As hereinbefore stated secondary lever H₅ is referred to herein as the output lever in that its operation moves to operate the error-indicating bar 23 to either of its two positions. In the present case wherein link bar G₅ is pulled toward base plate A, that is, toward the right, extended portion 17, of error-indicating bar 23 is also pulled toward the right to move the wards on the inner edge of bar 23 into alignment with the regular pull bars to prevent their operation. However, when the error-indicating bar 23 is pulled toward the right a notch moves into alignment with a notch in each of code selector bars 24 and 25 and this alignment appears in front of pull bar 31 which is connected to special type bar 32. Pull bar 31 under the influence of its spring 33 is drawn into its alignment of notches so that it is engaged on the next stroke of the printing bail and operates special type bar 32 whereby an error symbol is recorded in place of the character representing the signal combination which contained the error.

*Correct signal combination (Fig. 11)*

In Fig. 11 is shown the same mechanism as in Fig. 10 but operated in a manner to indicate how the output lever H₅ is operated when the code signal combination is correct. The six-unit code signal is assumed to be mark, mark, mark, mark, space and space. Both the total marks and total spaces of this signal combination are even numbers.

*First lever assembly*

In response to the first signal element, which is a mark, the first regular code selector bar 25 is operated toward the right to push link bar G₁ and the lower end of primary lever F₁ toward base plate A. The second signal element which is also a mark, operates the second code selector bar 25 toward the right to push both link bar G₂ and the upper end of primary lever F₁ toward base plate A. This operation causes primary lever F₁ to position its slider D₁ in the innermost portion of slot C₁ in which position primary lever F₁ is in a vertical plane toward base plate A. Secondary lever H₁ is so moved by the upper stud of the two mounted on slider D₁ that its upper end is toward base plate A and its lower end is away from base plate A, the center pivot of secondary lever H₁ being fixedly mounted in the stationary plate J₁ as shown in the exploded view of the lever assembly of Fig. 3.

*Second lever assembly*

The secondary lever H₁, having been positioned with its upper end toward base plate A and its lower end away from base plate A, causes the lower end of primary lever F₂ to assume the position away from base plate A. In response to the third signal element, which is another mark, the third code selector bar 25 is operated toward the right to push the link bar G₃ and the upper end of primary lever F₂ toward base plate A. Since the lower end of primary lever F₂ is held in a position away from base plate A by shaft 19 and secondary lever H₁, and the upper end of primary lever F₂ is held toward base plate A, slider D₂ assumes a position in the middle portion of slot $C_2$ and the secondary lever $H_2$ is accordingly moved to its normal position by spring $K_2$.

Third lever assembly

When the secondary lever $H_2$ is in its normal position, that is, its upper end away from base plate A and its lower end toward base plate A, as shown in assembly No. 2 (Fig. 11) primary lever $F_3$ of assembly No. 3 assumes the position wherein its lower end is toward base plate A since the lower end is connected to the lower end of secondary lever $H_2$ by shaft 20. In response to the fourth signal element, which is also a mark, the fourth code selector bar 25 is operated toward the right to push link bar $G_4$ and the upper end of primary lever $F_3$ toward base plate A. Primary lever $F_3$ is therefore positioned with both its upper and its lower end toward base plate A so that slider $D_3$ assumes a position in the innermost portion of slot $C_3$. Accordingly, secondary lever $H_3$ is operated under the influence of the upper stud of slider $D_3'$ so that its upper end is moved toward base plate A and its lower end away from base plate A.

Fourth lever assembly

Since secondary lever $H_3$ is in its normal position primary lever $F_4$ of assembly No. 4 assumes the position wherein its lower end is away from base plate A. In response to the fifth signal element, which is a space, the fifth code selector bar 25 is operated toward the left to pull link bar $G_5$ and the upper end of primary lever $F_5$ away from base plate A and slider $D_4$ therefore assumes the position in the outermost portion of slot $C_4$. Accordingly, primary lever $F_5$ assumes the position in a vertical plane away from base plate A and secondary lever $H_4$ is operated under the influence of the lower stud of slider $D_4'$ so that its lower end is moved away from base plate A and its upper end is moved toward base plate A.

Fifth lever assembly

With the secondary lever $H_4$ in the position shown in assembly No. 4 (Fig. 11), primary lever $F_5$ assumes a position wherein its lower end is away from base plate A. In response to the sixth signal element, which is another space, the sixth code selector bar 24 is operated toward the left to pull link bar $G_6$ and the upper end of primary lever $F_5$ away from base plate A and slider $D_5$ is therefore positioned in the outermost portion of slot $C_5$, in which position primary lever $F_5$ assumes a vertical position away from base plate A. Therefore secondary, or output, lever $H_5$ is influenced by the lower stud on slider $D_5'$ to move its lower end away from base plate A and its upper end toward base plate A.

The lower end of output lever $H_5$ upon being moved toward the left, away from base plate A, pushes link bar $G_7$ and connecting bar 17 toward the left to operate error-indicating bar 23 toward the left. This is the result when no error occurs in the signal combination and the desired pull bar corresponding to the signal combination is allowed to operate whereby the type bar associated with the operated pull bar records the desired character. The error-indicating bar 23 upon being operated toward the left also prevents the recording of the error symbol because pull bar 31 associated with special type bar 32 can not operate at this time.

What is claimed is:

1. In a signaling system, a source of signal combinations, a mechanically operated lever assembly including a lever operable under the conjoint control of at least two code elements of any signal combination from said source, and a discriminator in said assembly operable selectively differently according to similarity or dissimilarity of successive code elements.

2. In a signaling system, a source of signal combinations, an arrangement of mechanically operated lever assemblies, the levers of each, in turn, being operable under the conjoint control of at least two code elements of any of the signal combinations of said source, and a discriminator in said arrangement operable selectively differently according to similarity or dissimilarity of successive code elements.

3. In a signaling system, a source of signal combinations, a mechanical device comprising a plurality of mechanically operated assemblies, levers in each of said assemblies responsive to at least two code elements of any of said signal combinations, and means operating differently solely according to the similarity and dissimilarity of signal elements.

4. In a signaling system, a source of teletypewriter signal combination, a mechanical device comprising a plurality of mechanically operated assemblies, levers in each of said assemblies responsive to marking and spacing elements in any of said signal combinations, and means responsive to the joint control of the lever of the last of said plurality of assemblies and the levers of the preceding assemblies of said plurality, operable independently of each other, for discriminating between the oddness or evenness of the total number of marking elements of said signal combination.

5. In a signaling system, a source of signal combinations, an arrangement of lever assemblies, each, in turn, being operable in response to the elements of a signal combination, operable means in each assembly controlled by two or more elements of a signal combination, and indicator means controlled by the assembly that responds to the last element of the signal combination for manifesting non-conformity of the elements of a signal combination to a predetermined standard with regard to number and kind.

6. In a signaling system, a source of signal combinations, an arrangement of lever assemblies, each, in turn, being operable in response to the elements of a signal combination, operable means in each assembly controlled directly in response to one or more elements of each signal combination, means interconnecting said assemblies reactive to the preceding elements of each signal combination, and indicator means controlled by the assembly that responds to the last element of the signal combination for manifesting non-conformity of the elements of a signal combination to a predetermined standard with regard to number and kind.

7. In a signaling system, a source of signal combinations, a plurality of primary plates and a plurality of secondary plates alternately mounted edgewise in parallel planes, a sliding element arranged to move from one to another of several locations in a slot in each of said primary plates, a primary lever operable in response to at least two successive elements of a signal combination for moving each of said sliding elements from one to another of said locations in accordance with the selective natures of said elements, a secondary lever pivoted on each of said secondary plates and operably conditioned by the sliding element on the associated primary plate, means for interconnecting each of said secondary levers to the next succeeding primary lever, and indicator means controlled by the last of said secondary levers for manifesting non-conformity of said signal elements to a predetermined standard with regard to number and kind.

8. In a signaling system, a source of signal combinations, comprising marking and spacing elements, a plurality of primary plates and a plurality of secondary plates alternately mounted edgewise in parallel planes, a sliding member arranged to move from one to another of several locations in a slot in each of said primary plates, a primary lever on each of said sliding members operable in response to an element of said signal combination and reactive to the preceding elements of said signal combination for moving said sliding member from one to another of said locations, a secondary lever pivotally mounted on each of said secondary plates and operably conditioned by the sliding member on the next preceding primary plate, means for interconnecting each of said secondary levers to the next succeeding primary lever, and indicator means controlled by the last of said secondary levers for manifesting non-conformity of said signal elements to a predetermined standard with regard to the oddness or evenness of the number of elements of each kind.

9. In a signaling system, a source of coded signal combinations, a plurality of primary plates, a plurality of secondary plates, a base plate on which said primary and said secondary plates are alternately mounted edgewise and parallel, a sliding member arranged to move from one to another of several locations in a slot in each of said primary plates, a primary lever pivotally mounted on each of said members and operable in response to at least two successive elements of a signal combination for moving the member from one to another of said locations, a secondary lever pivoted on each of said secondary plates and movable to either of two extreme positions by the sliding member on the associated primary plate, a pivoted connection between the end of each secondary and the end of the next succeeding primary lever, and means conditioned by the preceding elements of a signal combination and operable by the last element for positioning the last of said secondary levers in either of two positions to indicate conformity or non-conformity of said elements to a predetermined standard with regard to number and kind.

10. In a telegraph system, a source of permutation code signals, comprising marking and spacing elements, a plurality of lever assemblies corresponding in number to the selecting signal elements less one, in a signal combination, each assembly comprising a primary and a secondary mounting plate, a sliding member arranged to move from one to another of several locations in a slot in said primary plate in response to two or more successive elements of a signal combination, a primary lever pivoted on one side and two studs obliquely disposed to each other and fixedly mounted on the other side of said sliding member, a secondary lever pivoted on said secondary plate, extending between said studs and movable to one of its operative positions by either of said studs when said sliding member is moved from an intermediate to either of its extreme locations, a pivotal connection between the secondary lever of one assembly and the primary lever of the next succeeding assembly, means effective upon the primary levers under the control of the elements of each signal combination for positioning the secondary lever of the last assembly in either of two positions to indicate conformity or non-conformity of said marking and spacing elements to a predetermined relationship.

11. In a signaling system, a source of coded signal combinations of marking and spacing elements, a plurality of primary plates, a plurality of secondary plates, a base plate on which said primary and said secondary plates are alternately mounted edgewise and in parallel, a sliding member arranged to move from one to another of several locations in a slot in each of said primary plates, a primary lever pivotally mounted on one side of said member and operable in response to at least two successive elements of a signal combination for moving said sliding member from one to another of said locations, two studs obliquely disposed to each other on the other side of said sliding member, a secondary lever pivoted on each of said secondary plates, normally engaging the inner sides of the studs thereon and movable to its operated position by either of said studs, a pivotal connection between an end of each secondary lever and an end of the next succeeding primary lever, means conditioned by the preceding elements of each signal combination and operable by the last signal element for positioning the last of said secondary levers in either its normal position or operated position to indicate whether the number of marking elements in each signal combination is odd or even.

12. In a signaling system, a system of interconnected mechanically operated levers, a source of signal combinations comprising elements having one or another of at least two different selective characteristics, a plurality of mechanically operated members positionable in response to the elements of said signal combinations and each having connection to a lever of said system, and means responsive to the conjoint operation of said levers for indicating whether or not the numbers of elements of different selective characteristics in each signal combination are in predetermined relationship to one another.

WILTON T. REA.

References Cited in the file of this patent

UNITED STATES PATENTS

| Number | Name | Date |
|---|---|---|
| 1,139,972 | Henschel et al. | May 18, 1915 |
| 2,329,782 | Panissidi | Sept. 21, 1943 |
| 2,550,600 | Rehm | Apr. 24, 1951 |

FOREIGN PATENTS

| Number | Country | Date |
|---|---|---|
| 616,426 | Spencer et al. | Jan. 21, 1948 |